March 10, 1959  H. A. NASON  2,876,498
METHOD OF FORMING REINFORCED PAN
Filed Aug. 17, 1953  2 Sheets-Sheet 1

INVENTOR.
HAROLD A. NASON
BY
HIS ATTORNEY

March 10, 1959

H. A. NASON 2,876,498

METHOD OF FORMING REINFORCED PAN

Filed Aug. 17, 1953

*INVENTOR.*
HAROLD A. NASON
BY
HIS ATTORNEY

United States Patent Office 2,876,498
Patented Mar. 10, 1959

2,876,498

METHOD OF FORMING REINFORCED PAN

Harold A. Nason, Erie, Pa., assignor to General Electric Company, a corporation of New York Application August 17, 1953, Serial No. 374,473

1 Claim. (Cl. 18—59)

My invention relates to molded plastic articles and more particularly to reinforced plastic containers and methods for forming such containers.

Due to their low cost, very wide use has been made of containers formed of synthetic compositions such as thermosetting or thermoplastic material. One difficulty, however, with the use of these containers is that if they are to be used for long periods of time, they must be reinforced in one manner or another. Otherwise, cracking or other failure is likely to occur after relatively brief periods of service. But it has heretofore been quite difficult to form a reinforced plastic container without increasing cost to a very large extent. Although some less expensive methods of reinforcing have been suggested, these cheaper methods have not given very good results. Firstly, the number of imperfect pieces formed during molding is rather high and secondly, perfect pieces formed by such processes have not stood up too well in use. In both cases, the most common failure in the pieces has been cracking at their corners.

Therefore, it is an object of my invention to make a new and improved reinforced plastic container.

It is another object of my invention to make a reinforced plastic container in which the reinforcement applies no destructive forces to the corners of the container.

It is a further object of my invention to provide a new and improved means for securing reinforcing means within a plastic article.

It is a still further object of my invention to provide a new and improved method of making a reinforced plastic article.

My invetnion also has as its object, the provision of a new and improved method for making reinforced plastic containers in which the formation of the container and the incorporation of the reinforcing means are accomplished in a single operation.

In carrying my invention into effect I provide a plastic container which includes a fold or bead around its upper edge. The container is reinforced by a more or less rigid member which is fitted into this bead during the molding process and which, according to my invention, is supported only along the sides of the container and not at its corners or adjacent thereto. Preferably, I support the reinforcing member along the sides by oppositely disposed spaced ears formed in the bead during the molding process.

My new and improved molding method forms the container and incorporates the reinforcing member within the bead all in one operation. To do this I position the reinforcing member around the cavity of the mold, lay a sheet of thermoplastic material over the mold so as to cover the reinforcing member and the cavity, and then force or draw the sheet into the cavity. Due to the manner in which it is performed, this drawing action causes the edge portions of the sheet to fold over and grip the reinforcing member along the sides of the cavity at the same time as it forces the center portion of the sheet into the cavity to assume the contours thereof.

For a better and more complete understanding of my invention, together with additional objects and advantages thereof, reference should now be had to the following description and accompanying drawings in which.

Figure 2:
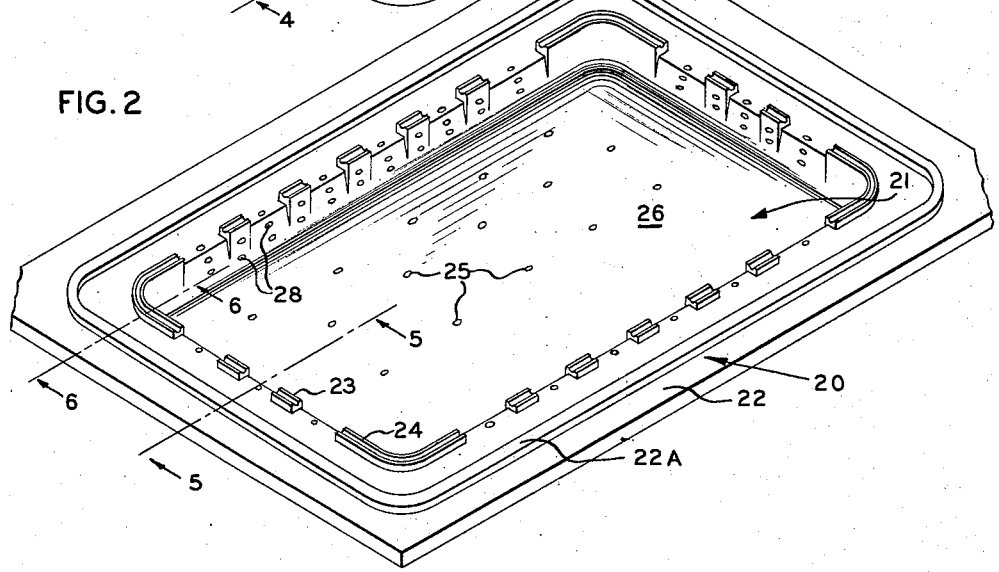
Fig. 2 is a perspective view of a mold which I use in my preferred method of forming the container shown in Fig. 1.
Figure 5:
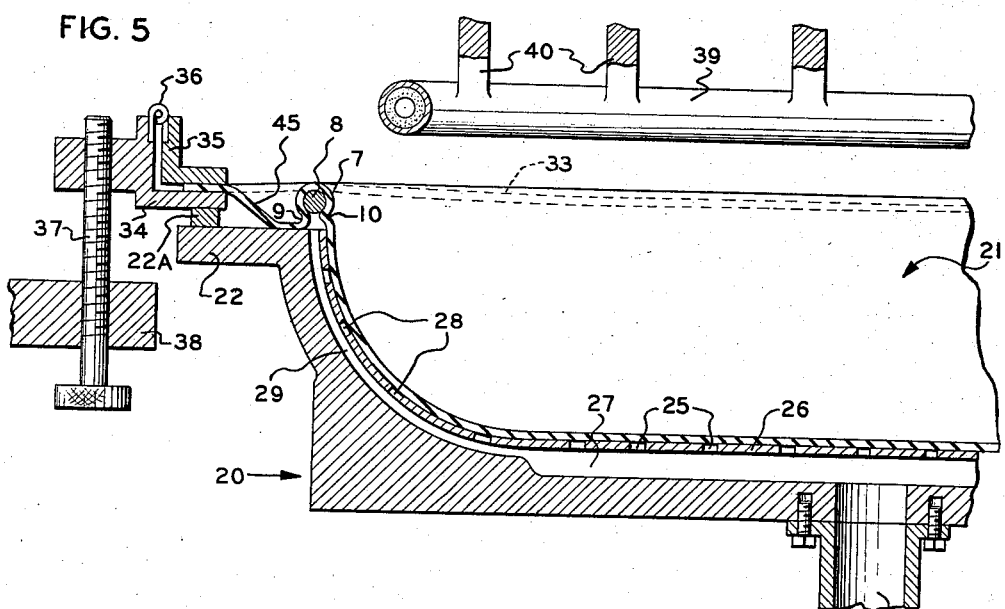
Figure 6:
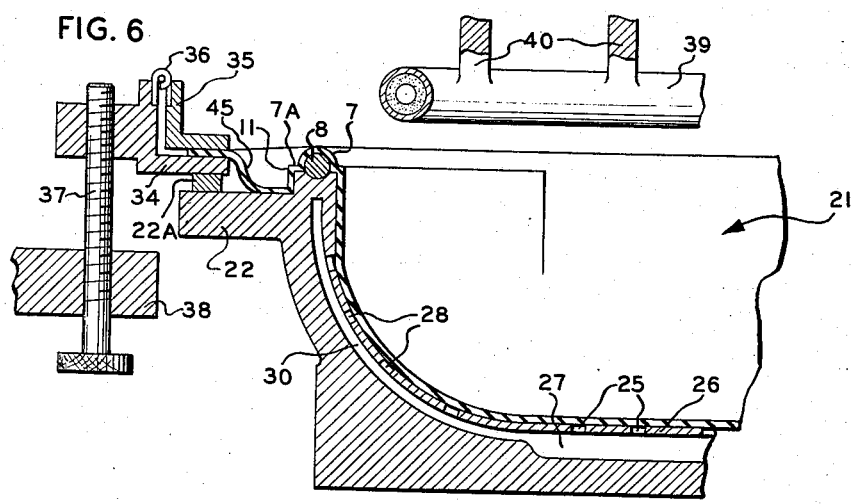

Fig. 5 is a partial sectional view of the mold taken on the line 5—5 of Fig. 2 showing in addition to the mold clamping apparatus used therewith and the rough container after drawing, and also showing in dotted lines the thermoplastic sheet before the drawing is begun; and Fig. 6 is a partial sectional view taken on the line 6—6 of Fig. 2 also showing in addition to the mold the clamping apparatus and the rough container still in place after the molding process.

Figure 1:
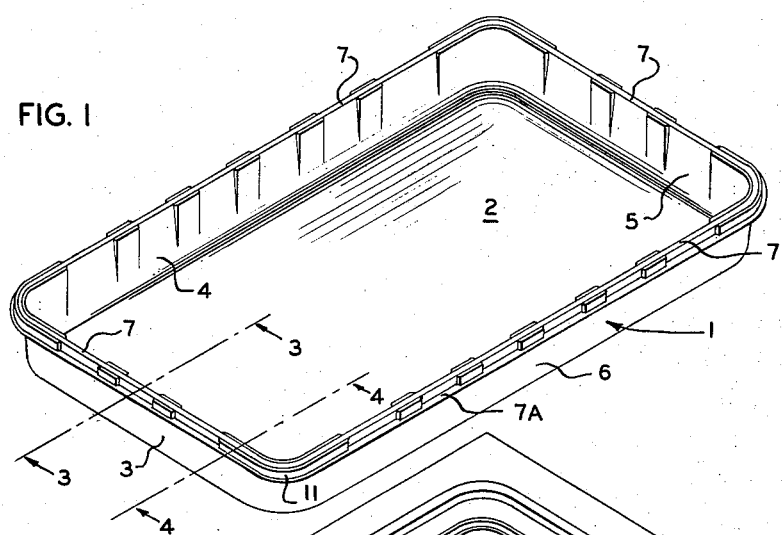
Fig. 1 is a perspective view of a preferred embodiment of my new and improved reinforced plastic container.

Referring now to Fig. 1, I have shown therein a refrigerator drip pan 1 formed of suitable thermoplastic or thermosetting material as for example polystrene, royalite, Lucite, vinyl, or cellulose acetate. The pan 1 includes a bottom 2 and sides 3, 4, 5, and 6 joined together by rounded corners. Each of these sides has formed thereon a folded-over upper edge or lip and these folded edges are joined together at the corners to form a single continuous fold or bead 7 running all the way around the top of the pan.

Figure 3:
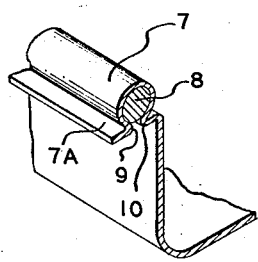
Fig. 3 is a fragmentary view in perspective showing the section 3—3 of Fig. 1.
Figure 4:
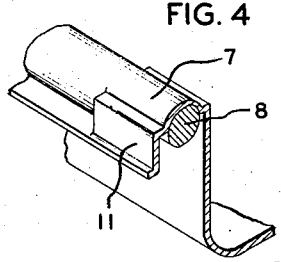
Fig. 4 is a fragmentary view in perspecitve showing the section 4—4 of Fig. 1.

Positioned within this fold, as may be better seen in Figs. 3 and 4, is a more or less rigid reinforcing member such as the wire 8. Wire 8 is preferably held in position by means of plurality of ears, such as the ears 9 and 10 which are formed in the sides 3, 4, 5, and 6 of the container and in the depending skirt or lip 7a of the fold. These ears fit under the reinforcing member 8 and tightly grip it so as to hold it firmly in position. Preferably the various ears in the sides of the container, as for example, ear 10 are oppositely disposed to the ears in the fold skirt, for example ear 9. By positioning the side and the skirt or lip ears diametrically opposite from each other across the wire a much firmer gripping of the wire is obtained. However, it should be understood that I also contemplate a structure in which the side ears and the skirt ears are spaced longitudinally from each other.

In the diagram I have shown six pairs of oppositely disposed, spaced ears on the long sides 4 and 6 of the container while only showing three pairs of ears on the short sides 3 and 5, but it should be understood that I do not wish to restrict my invention to those particular numbers for the reinforcing member may be held firmly in place by either a greater or a lesser number of ears. Moreover, as mentioned above, the reinforcing member can be held in place by spaced staggered ears rather than by the oppositely disposed spaced ears shown. In fact it would be possible to anchor the reinforcing member in place by forming the fold skirt into one continuous ear or by forming a continuous ear on the container sides or by both. However, I have found that the oppositely disposed spaced ears shown in the diagram produce the best results.

It should be noted, however, that it is only along the central portions of the container sides and rim that I provide means for gripping the reinforcing member. As is shown clearly in Fig. 4, at the corners, as for example at corner 11, a much wider fold is provided so that the sheet touches only the top of the reinforcing wire and neither the container sides nor the fold skirt 7a touch the reinforcing wire. In other words the fold 7 is relatively wider at the corners of the container and along the side portions adjacent thereto so that the reinforcing member is supported only along the center portions of the container sides. This feature of not supporting the reinforcing wire at the corners of the pan produces a structure which is much less likely to fail than one in which the wire is supported at the corners. This is because a different expansion or contraction of the reinforcing means from that of the plastic container itself is less likely to produce stresses in the container and thereby cause corner cracking. Another reason for this structure will be explained hereinafter.

Moreover, it has been found that the reinforced container such as that shown in Fig. 1 is superior to those heretofore appearing on the market not only because it gives a longer period of service but also because it is simpler and less expensive to form. The entire reinforced container may be molded in one simple operation.

Referring now to Figs. 2, 5, and 6, I will describe my preferred method for molding a container such as that shown in Fig. 1. In this preferred method I utilize a dish-shaped vacuum type mold, such as the mold 20 which includes the deep mold cavity 21. Surrounding the cavity, the mold is provided with a broad flange 22 and formed integrally on this flange is an upstanding endless protuberance or ring 22a which extends around the cavity spaced somewhat therefrom. Also, positioned on this flange but contiguous to the cavity, i. e., between ring 22a and the cavity, are a plurality of spaced bosses, such as bosses 23 and 24. It should be noted that each of the longer sides of the mold contains five of the short straight bosses similar to boss 23 while each of the shorter sides of the mold contains two of these bosses. Each corner of the mold is provided with a curved boss similar to boss 24. These curved bosses not only extend completely around the corners but also extend for a distance along the adjacent sides of the mold. All of the bosses whether curved, corner bosses or straight, side bosses are preferably provided in their upper surface with a longitudinal groove for a purpose to be later described.

As may be best seen in Fig. 5, the mold cavity 21 is provided with a plurality of apertures 25 in its lower surface 26, which apertures lead into a large chamber 27 positioned beneath the lower surface. In addition to apertures 25 in its lower surface the mold cavity also includes the apertures 28 in its side surfaces. These side apertures 28 are connected to the chamber 27 by passageways similar to the passageways 29 and 30 shown respectively in Figs. 5 and 6. As shown by passageway 29, some of these passageways may extend upwardly toward the top of the mold and actually pierce the flange 22 between adjacent bosses. However, those passageways such as the passageway 30 which would extend upwardly through a boss if continued to the surface of the mold are left closed off by such bosses. The aforesaid chamber to which all these apertures and passageways are connected is itself further connected by a conduit 31 to a means for producing a vacuum, i. e., to a means for exhausting chamber 27. No particular type of pumping apparatus is shown, for any suitable means may be employed to produce the desired vacuum.

In using mold 20 in the practice of my new and improved method of forming a plastic container, I first place a reinforcing member such as the wire 8 in the grooves in the tops of the various bosses positioned around the mold cavity 21. Then as indicated by the dotted lines in Fig. 5, I place a sheet 33 of thermoplastic material over the mold so that it covers both the mold cavity 21 and the reinforcing wire 8. Next I clamp the sheet of plastic material to the mold flange 22 outward of the various bosses. Any suitable means may be used to accomplish this clamp, the hingedly connected clamping rings 34 and 35 shown in Fig. 5 being but one preferred method of securing the desired result. But whatever clamping means are employed, care should be taken to insure that a substantially air tight seal is provided between the flange 22 and the edge of the plastic sheet 33.

For example if the rings 34 and 35 are used, the plastic sheet is first placed so that its lower surface rests on the lower ring 34. Then the upper flange ring 35 is swung downwardly on the hinges, such as hinge 36, so that it rests on the upper surface of sheet 33. The sheet 33 is thereby effectively clamped between and sealed to the rings 34 and 35. To complete the sealing process, it is then only necessary to move the rings downwardly until the lower surface of ring 34 makes firm contact with the upstanding ring 22a on flange 22. This contact forms the final seal shutting off the mold cavity from atmosphere. In the diagram I have shown the screw 37 mounted in a supporting fixture 38 as illustrative of the numerous means which may be used to move rings 34 and 35 relative to mold 29. It should also be obvious that the rings could be held stationary and the mold moved upwardly to complete the seal.

After sheet 33 is clamped and the seal completed, I next heat the sheet by means of a heating element positioned thereabove. For example, in Figs. 5 and 6 I have shown an electrical resistance heater 29 mounted above the sheet by means of the stringers 40 which may be attached to any fixed supporting means. The heat, of course, renders the thermoplastic or thermosetting sheet truly plastic and ready for drawing.

Once the sheet is sufficiently heated, I then exhaust the mold cavity 21 by means of a vacuum applied through chamber 27 and exhaust conduit 31. As the chamber is exhausted, the resulting higher pressure on the top of the plastic sheet forces it downwardly until it assumes the contours of the mold cavity. In other words, the high atmospheric pressure on the top of the sheet forces it downwardly against the surfaces of the mold cavity.

Simultaneously with the forming of the main container, the edge portion of the sheet is forced downwardly around wire 8 and the bosses, such as bosses 23 and 24. In other words, the vacuum beneath the sheet causes the edge portion of the sheet to form a fold or bead 7 over the reinforcing wire 8. Moreover, in the areas between the bosses to which open ended passageways, such as passageway 29, extend, the vacuum causes protuberances or ears to be drawn beneath the wire. The higher atmospheric pressure tends to force the plastic sheet beneath the wire on both sides of the rim wherever possible, and thereby with this type of mold causes a pair of oppositely disposed ears, such as ears 9 and 10, to be formed between said pair of adjacent bosses. One of each pair of ears, for example ear 9, protrudes inwardly from the depending skirt 7a of fold 7 whereas the other of the pair, for example ear 10, protrudes outwardly from the side of the container. Along any side of the container there are, of course, formed a plurality of pairs of these oppositely disposed ears, no ears being formed in the areas overlying the bosses and a pair of ears being formed in each space between bosses. These oppositely disposed, spaced ears hold wire 8 firmly within fold 7 once the molding is completed.

Due to the curved corner bosses, such as boss 24, no ears are, of course, formed in the corners of the container or along the portions of the sides adjacent thereto. Rather the fold 7 merely touches the top of the wire and provides no support whatsoever along the sides of the wire. In fact in the preferred embodiment of the mold the curved, corner bosses are made wider than the straight, side bosses so that the fold over the corner bosses is relatively wider than the fold over the side bosses and the spaces lying between the side bosses. Preferably, as shown in Fig. 6, the corner bosses are made so wide that, in the areas overlying them, skirt 7a and the sides of the container do not even touch the sides of wire 8. The wider fold at the corners of the container insures that the reinforcing wire cannot be gripped by the plastic at the corners or adjacent thereto.

This deliberate failure to support the reinforcing member at the corners of the container is a very important feature of my invention, for it allows for shrinkage of the plastic at the corners during cooling. After the molding process is completed, the plastic, of course, shrinks far more than does the reinforcing member so that if the reinforcing member were gripped at the corners there would be stresses set up in the corners. Such stresses would very likely result in cracking of the pan either immediately or after a period of use. However, with my invention no stresses are set up at the corners no matter how great is the difference in shrinkage between the plastic and the reinforcing member.

Once the container has been formed, as described above, the clamps may be loosened and the container removed from the mold. The only step then remaining to produce the finished article is to remove the flange 45 which is necessarily formed outward of the fold 7 during drawing. Any suitable trimming operation may be employed to cut that undesirable projection from the fold skirt 7a.

Thus, from the above, it may be seen that through my preferred method of molding I form the container and incorporate the reinforcing means therein in a single molding operation. Moreover, by gripping the reinforcing member only along the sides of the finished container I provide a structure wherein no destructive stresses are set up in the corners during shrinkage. Also, no stresses can be set up in these corners due to different thermal expansion or contraction of the reinforcing means and the container during use. This method thus not only reduces the number of molding failures, but also provides a finished product which is more durable in service.

However, it should be understood that my invention is not limited to the particular mold and finished product described above. Nor is it limited to the particular thermosetting or thermoplastic materials listed herein. Moreover, it is, of course, obvious that various different shapes of reinforced containers can be produced by my new and improved method. And the reinforcing wire need not be supported around the mold cavity exactly as shown; for example, supporting pins could be interspersed between the bosses or could be utilized exclusively along the sides if so desired. Additionally, I do not wish to be limited to the exact manner described of drawing the material into the mold. Other ways of forcing the plastic sheet around the reinforcing member and against the surface of the mold cavity could also be used.

Thus, while I have illustrated and described my invention in connection with one preferred embodiment thereof, many modifications will occur to those skilled in the art and it must, therefore, be understood that I intend by the appended claim to keep all such modifications as fall within the true spirit and scope of my invention.

What I claim as new and desire to secure by Letters Patent is:

A method of forming a reinforced plastic rectangular shaped container comprising, supporting a rectangular shaped wire reinforcing member on spaced supporting members positioned along the sides and at the corners of the cavity of a mold with said supporting members shaped to receive the lower portion of said wire reinforcing member, placing a sheet of thermoplastic material over said mold to cover said reinforcing member and said cavity, tightly clamping said sheet to said mold outward of said supporting members and finally exhausting said mold to draw said sheet into said cavity thereby in a single operation causing the center portion of said sheet to assume the contour of said cavity and the edge portions of said sheet to fold over and grip said reinforcing member substantially around the entire periphery thereof at spaced intervals only along the sides of said cavity with said sheet touching the corners of said reinforcing member only on the top thereof.

References Cited in the file of this patent

UNITED STATES PATENTS

| | | |
|---|---|---|
| 255,165 | Hale | Mar. 21, 1882 |
| 892,702 | Wyman | July 7, 1908 |
| 1,531,504 | Roberts | Mar. 31, 1925 |
| 1,871,982 | Geyer | Aug. 16, 1932 |
| 2,241,781 | Jackson | May 13, 1941 |
| 2,354,916 | Hurt | Aug. 1, 1944 |
| 2,485,372 | Farrell | Oct. 18, 1949 |

FOREIGN PATENTS

| | | |
|---|---|---|
| 58,091 | Australia | Mar. 10, 1913 |